US012689816B2

(12) United States Patent
Cai et al.

(10) Patent No.: US 12,689,816 B2
(45) Date of Patent: Jul. 21, 2026

(54) SYSTEMS AND METHODS FOR PROJECTING ILLUMINATION FROM A DEVICE EDGE

(71) Applicant: II-VI Delaware, Inc., Wilmington, DE (US)

(72) Inventors: Pei-Song Cai, Gunter, TX (US); Hong-Zhi Liu, Gunter, TX (US); Jason O'Daniel, Gunter, TX (US); Francesco Schiattone, Gunter, TX (US); Yi-Yung Chen, New Taipei (TW)

(73) Assignee: II-VI Delaware, Inc., Wilmington, DE (US)

( * ) Notice: Subject to any disclaimer, the term of this patent is extended or adjusted under 35 U.S.C. 154(b) by 287 days.

(21) Appl. No.: 18/157,611

(22) Filed: Jan. 20, 2023

(65) Prior Publication Data

US 2024/0251150 A1     Jul. 25, 2024

(51) Int. Cl.
*H04N 23/56*     (2023.01)
*H04N 23/55*     (2023.01)
(52) U.S. Cl.
CPC ............. *H04N 23/56* (2023.01); *H04N 23/55* (2023.01)
(58) Field of Classification Search
CPC ........ H04N 23/56; H04N 23/55; H04N 23/57; H04M 1/0266; H04M 1/0264; H04M 1/0272; H04M 1/22; H04M 1/026; G03B 2215/0503; G03B 2215/0567; G03B 2215/0582; G03B 2215/0589; G03B 17/54; G03B 30/00; G03B 15/05
See application file for complete search history.

(56) References Cited

U.S. PATENT DOCUMENTS

| | | | | |
|---|---|---|---|---|
| 2011/0187878 A1* | 8/2011 | Mor | ..................... | H04N 13/207 |
| | | | | 348/E5.024 |
| 2015/0380897 A1* | 12/2015 | Canumalla | ............ | H01S 5/0239 |
| | | | | 348/135 |
| 2016/0164261 A1 | 6/2016 | Warren | | |
| 2017/0115497 A1* | 4/2017 | Chen | .................... | H04N 13/207 |
| 2019/0049235 A1 | 2/2019 | Han et al. | | |

(Continued)

FOREIGN PATENT DOCUMENTS

| | | | | |
|---|---|---|---|---|
| CN | 108490628 A | * | 9/2018 | ......... G01B 11/2513 |
| CN | 115396648 | | 11/2022 | |

(Continued)

OTHER PUBLICATIONS

European Office Communication with extended European Search Report Appln No. 23172161.4 dated Oct. 13, 2023.

(Continued)

*Primary Examiner* — Nhan T Tran
(74) *Attorney, Agent, or Firm* — McAndrews, Held & Mallloy, Ltd.

(57) ABSTRACT

Transmission assemblies to project illumination from an edge of an electronic device are disclosed. In some examples, the transmission assemblies include an optical source to generate laser light. An optical focusing element to focus the laser light. And a transmitting optical element is arranged at a bezel proximate an external edge of the electronic device. The transmitting optical element receives the laser light from the transmitting optical element and to project the laser light through the bezel to illuminate an object of interest

17 Claims, 3 Drawing Sheets

(56) References Cited

U.S. PATENT DOCUMENTS

| 2019/0131766 | A1 * | 5/2019 | Enzmann | ............ | H01S 5/02257 |
| 2020/0033711 | A1 * | 1/2020 | Ma | .................... | G01B 11/2513 |
| 2020/0067264 | A1 | 2/2020 | Guo et al. | | |
| 2020/0328576 | A1 * | 10/2020 | Sakai | ................ | G02B 27/4205 |

FOREIGN PATENT DOCUMENTS

| EP | 3913914 | B1 * | 12/2022 | ......... G01B 11/2513 |
| JP | 2019-515487 | A | 6/2019 | |
| JP | 6763452 | B | 9/2020 | |

OTHER PUBLICATIONS

Japanese Office Action Appln No. 2023-124113 dated Feb. 26, 2024.

European Patent Office, Office Action, Application No. 23172161.4-1001, dated May 15, 2026, 7 pages.

* cited by examiner

SYSTEMS AND METHODS FOR PROJECTING ILLUMINATION FROM A DEVICE EDGE

BACKGROUND

Many electronic devices include one or more cameras. Some cameras capture light of a predetermined wavelength. In order to illuminate an object of interest, electronic devices employ additional illumination sources with light at the given wavelength. For cameras configured to capture images of an object of interest (such as a user's face) facing a display screen, conventional devices have removed a portion of the display in order to orient the illumination sources toward the object. However, the removed portion results in a visible notch in the display, disrupting the viewing experience and causing the display to be notched during manufacture, which often leads to complications.

The subject matter of the present disclosure is directed to avoiding the negative aspects of the problems set forth above.

SUMMARY OF THE DISCLOSURE

According to the present disclosure, transmission assemblies to project illumination from an edge of an electronic device are disclosed. In some examples, the transmission assemblies include an optical source to generate laser light. An optical focusing element focuses the laser light. And a transmitting optical element is arranged at a bezel proximate an external edge of the electronic device. The transmitting optical element receives the laser light from the optical source and projects the laser light through the bezel to illuminate an object of interest.

These and other features of the present disclosure will become more fully apparent from the following description and appended claims, as set forth hereinafter.

BRIEF DESCRIPTION OF THE DRAWINGS

To further clarify the above and other features of the present disclosure, a more particular description of the subject matter will be rendered by reference to specific examples thereof, which are illustrated in the appended drawings. It is appreciated that these drawings depict only some examples of the subject matter and are therefore not to be considered limiting of its scope.

DETAILED DESCRIPTION OF THE DISCLOSURE

Figure 1A:
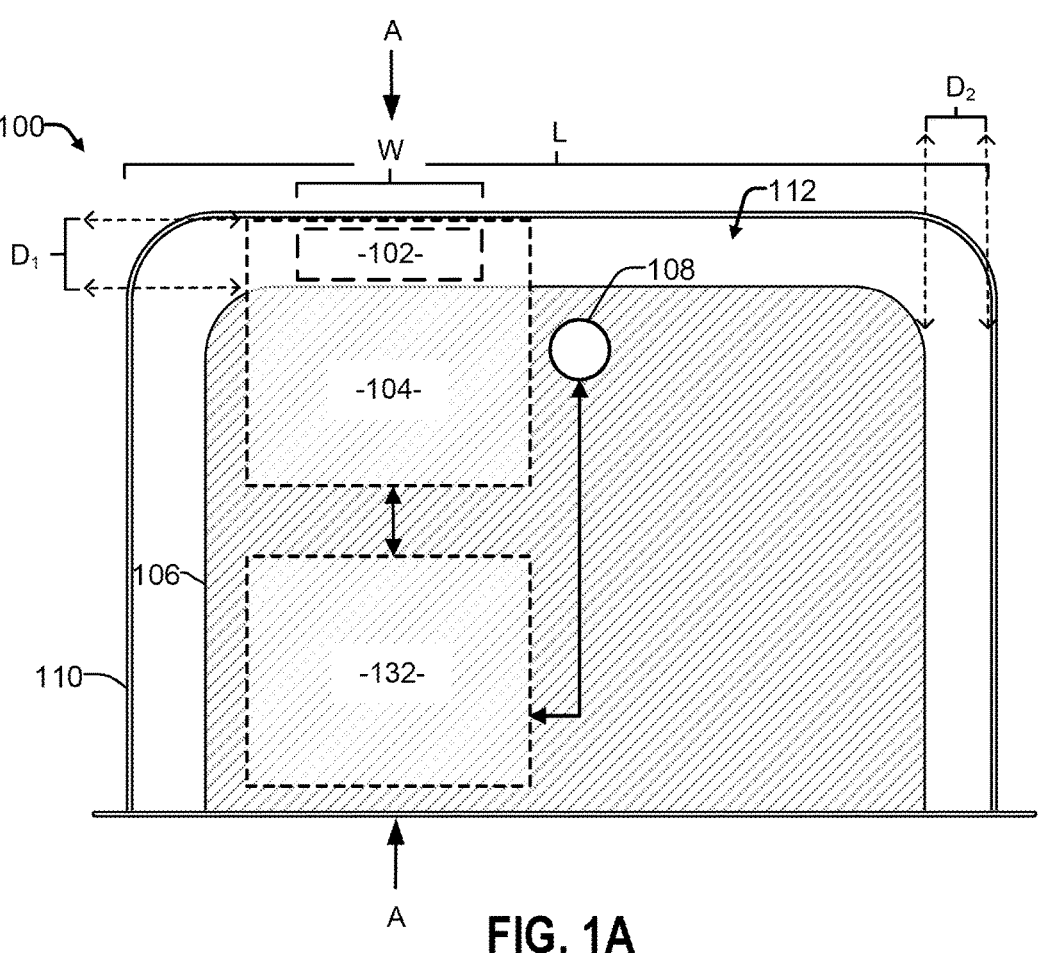
FIG. 1A illustrates a portion of an example electronic device with a transmission assembly incorporating an ultra-wide field illumination diffuser.

Electronic devices employing a transmitting optical element to illuminate an object of interest are disclosed. In particular, the device can include one or more of a device case defining an external edge of the electronic device, a display screen arranged within the device case, a transmission assembly, and/or a focusing optic to direct laser light to the transmitting optical element to project laser light from the transmission assembly to illuminate the object.

In some examples, the transmission assembly is arranged at least in part between the display screen and the device case. The focusing optic is operable to project laser light from the transmission assembly to illuminate the object. The projecting optic is arranged proximate the external edge of the electronic device, such as within a bezel between the external edge of the device and an edge of the display screen.

The transmitter assembly includes a number of components to generate, control, and/or direct the optical transmission (e.g., laser light). In some examples, the transmitter assembly includes one or more optical elements to transmit, channel, and/or direct laser light. The optical elements can include a first optical focusing element (e.g., a prism, a coated mirror, coated optical block, a lens, a reflector, etc.) to receive the laser from the EEL, and to direct the laser to a second optical transmitting optical element to structure and/or distribute the laser light. The structured/distributed laser light is then projected to an object of interest to provide illumination for a receiver sensor, such as for an image capture event.

In some examples, the transmitter assembly and/or one or more associated optical elements to transmit the laser to the object are located near the receiver. Advantageously, maintaining a limited proximity between the transmitter and/or optical elements and receiver limits environmental noise, scatter, and/or signal loss, among a list of non-exclusive benefits.

Personal electronic device manufacturers are offering technology to incorporate image capture devices (e.g., cameras) and/or front-facing sensors behind the device display screen. However, arranging the image capture device and/or the sensor may limit the amount of transmission of optical energy (e.g., laser transmission) from the optical source(s) (e.g., the EEL array) behind the display screen.

In order to avoid the low transmittance issues from projecting illumination through the display screen, the optical source and associated components are arranged beneath the display screen, while the transmitting optical element is configured to direct illumination through a bezel of the device between an edge of the display screen and the external edge of the electronic device.

For example, the laser from the optical source is directed to an optical focusing element (e.g., a prism, a coated mirror, coated optical block, a lens, a reflector, etc.) arranged at or near the bezel. The optical element reflector guides the laser from the EEL array to pass through the bezel or space along the edge of the electronic device, to be projected toward the object to be illuminated and/or imaged (e.g., a face of the operator).

By locating the transmitter assembly beneath the screen while arranging the optical transmitter in the edge beyond the screen, the transmitting optical element projects illumination to the object without cutting the screen, or suffering the impact of low transmittance issues that result from projecting illumination from the screen. For example, provision of flood and/or dot projector illuminator modules for personal device (e.g., face ID sensors of a smartphone display).

In some examples, the transmitter assembly is configured to operate as a dot and/or flood projector for a face identification (ID) sensor device.

FIG. 1A illustrates a portion of an example electronic device 100 with a transmission assembly 104 incorporating a transmitting optical element 102 (e.g., an ultra-wide field illumination diffuser). The optical element 102 is configured to direct illumination (e.g., laser light) through a bezel 112 of the device 100, between an edge of a display screen 106 and the external edge of device case 110 of the electronic device 100.

In the example of FIG. 1A, the transmission assembly 104 is arranged below the display screen 106, with a portion of the assembly extending into the space below the bezel 112. The optical element 102 is designed to fit within the bezel 112; as shown, the bezel 112 is defined by a first distance D1 on a first section (along the top of the illustrated portion), and by a second distance D2 on a second section (along the side of the illustrated portion). Accordingly, the dimensions of the optical element 102 are designed to fit within a given section of the bezel 112, which may include a first dimension less than or equal to D1 or D2, or a second dimension W less than or equal to a length of the device L.

The personal device 100 may include one or more receivers 108 to collect light, such as a photodiode light sensor, a Complementary Metal Oxide Semiconductor (CMOS) sensors, etc. The receiver 108 can be connected to one or more components of the device 100 to receive commands (e.g., to activate) and/or transmit information (e.g., captured light).

To enhance the capability of the receiver 108, the transmission assembly 104 generates an optical transmission, such as a laser light, to be output via the optical element 102. In some examples, the optical element 102 is configured to illuminate an object of interest (such as a face of an operator) to increase an intensity of light reflected from the object and therefore captured by the receiver 108. Thus, the device 100 may include one or more components 132 configured to control and/or coordinate operation of the transmission assembly and the receiver 108 to capture images of the object.

In some examples, the transmitter assembly 104 and/or the optical element 102 are located near the receiver 108. The optical element 102 can be designed to project the laser light in a particular pattern, with a particular focus, a particular distribution, depending on a given application. For example, to image a face of an operator holding the device 100, the optical element 102 may employ an illumination diffuser, which, at approximately arm's length, projects a distributed pattern of illumination in an area approximately equal to that of the operator's face.

In some disclosed examples, the optical element 102 is configured to convert light (e.g., from a light source with low divergence) into an illuminators with relatively standard field of illumination (FOI) values (e.g., greater than 40 and less than 90 degrees), and a desired target radiant intensity profile, whether this is a flood or dot illumination profile.

Although illustrated with the optical element 102 off-center relative to the position of the receiver 108, in some examples the optical element 102 is arranged in a section of the bezel 112 directly above and aligned with the receiver 108. Further, the receiver 108 is illustrated embedded with the display 106. In some examples, a notch or opening in the display 106 can expose the receiver 108, whereas in other examples the receiver 108 can be arranged in another location of the device 100, such as within the bezel 112.

Figure 1B:
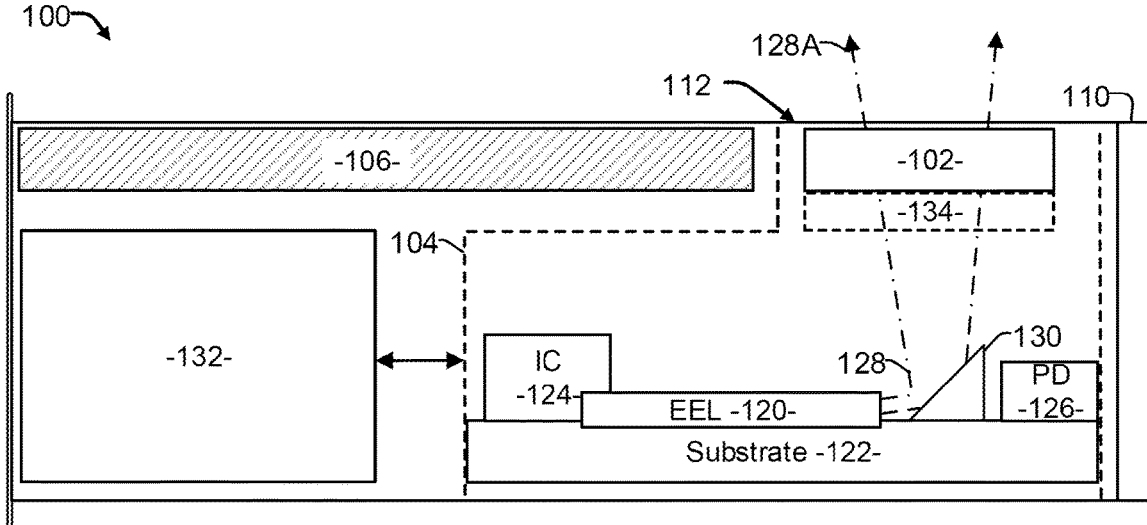
FIG. 1B illustrates a cross-sectional view of the portion of the example electronic device of FIG. 1A.

FIG. 1B provides a cross-section of the personal electronic device 100 of FIG. 1A. As shown, the optical element 102 can be physically and/or optically connected to the transmission assembly 104, such that one or more components of the transmission assembly 104 may be collocated with the optical element 102, and/or operable to direct illumination toward the optical element 102.

In the example of FIG. 1B, the transmission assembly 104 includes one or more of an edge emitting laser (EEL) 120, a substrate 122, an integrated circuit (IC—or controller, or control circuit) 124, a photodiode (PD) 126, an optical focusing element 130, and/or an optical projection element (e.g., a dot projection optical element) 134, as a list of non-limiting components.

In conventional devices, a portion of the display screen 106 would be cut away to provide an outlet for light transmission. In order to eliminate the need for a notch on the display screen, the disclosed transmission assembly 104 is configured to direct laser light 128 through the narrow bezel 112 between the display screen 106 and the edge of the device case 110 to accommodate assembly tolerances. To make efficient use of the space within the device 100, to facilitate assembly, and to optimize optical power, the EEL array 120 is placed under the display screen 106. The focusing element 130 is placed under the narrow bezel 112 to reflect light 128 from the EEL array 120, which may also transmit through the projection element 134.

In some examples, the focusing element 130 can consist of one or more of a prism, a coated mirror, coated optical block, a lens, and/or a reflector, as a list of non-limiting examples. In some examples, the focusing element 130 includes a reflecting surface designed with one or more of an aspherical or freeform surface, which serve to shape the beam of the laser 128, such as to circularize a dot projection of the projected laser 128A.

In some examples, by employing an appropriately designed diffractive optical element, the transmission assembly 104 is operable to project structured light with a random pattern. The projection element(s) 134 can consist of one or more micro-lens arrays, which can produce one or more projection patterns (e.g., rectangular, hexagonal, etc.), and/or one or more diffractive optical elements (DOE), which may provide an integrated collimation function for projecting a regular and/or a random dot pattern. For instance, for random dot pattern generation, the randomness in one dimension may rely on an irregular arrangement of the EEL array 120 (as shown in the EEL array of FIG. 3B). In this arrangement, the projection element 134 (configured as a DOE) generates the randomness in another dimension.

In some examples, one or more of the optical components may be embedded in the mechanical structure of the transmission assembly 104, the components 132, and/or the device housing, which may include mechanical reinforcements such as a rubber buffer (e.g., in and/or adjacent to the cover or device case 110).

It will be apparent in any teardown of a phone with a face ID sensor as the illuminator assembly will be outside the very edge of the phone screen in the narrow bezel.

Figure 2:
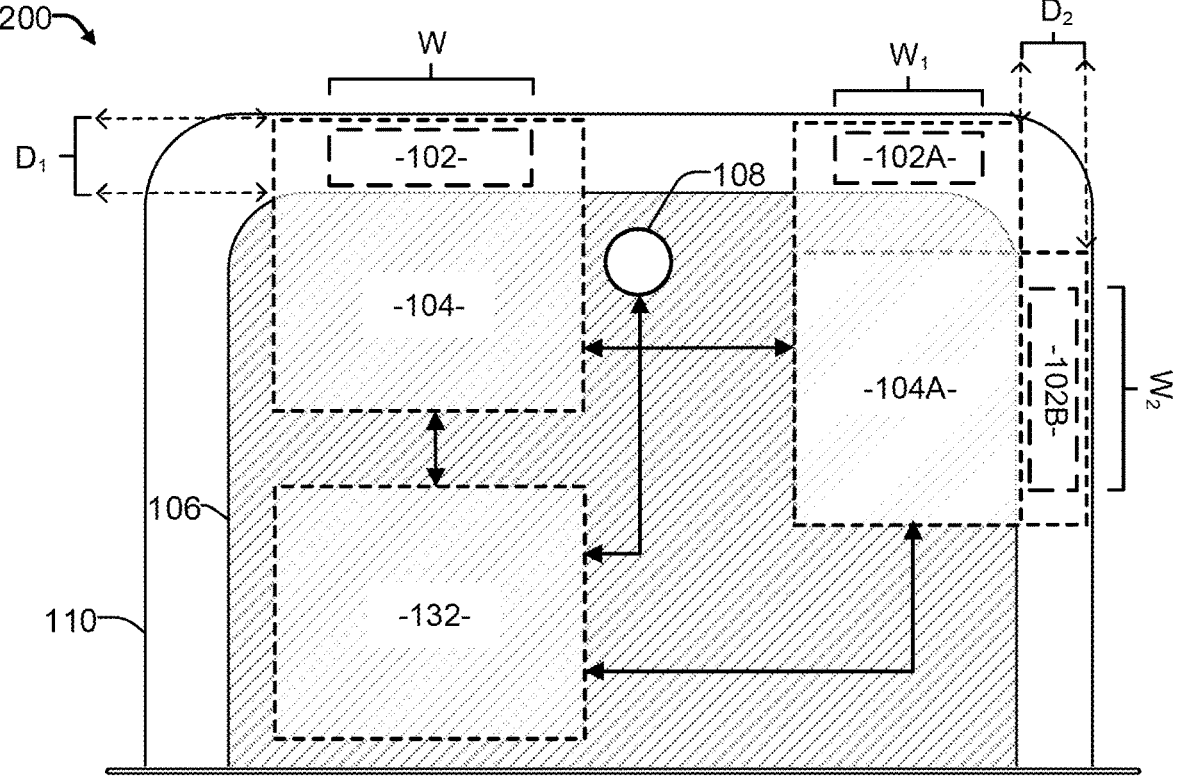
FIG. 2 illustrates a portion of another example electronic device with a transmission assembly incorporating an ultra-wide field illumination diffuser.

FIG. 2 illustrates a portion of another example electronic device 200 with two or more transmission assemblies 104 and 104A. As shown, transmission assembly 104 is similar to the transmission assembly 104 of FIGS. 1A and 1B. Transmission assembly 104A is configured to incorporate one or more transmitting optical elements 102A and/or 102B (e.g., illumination diffusers or pattern generator optics). The optical elements 102A and/or 102B are arranged along the bezel 112 of the device 100, and may be arranged in line with element 102 (as is element 102A), and/or arranged on an orthogonal edge (as is element 102B). Optical element 102A may have a width of W1, whereas optical element 102B may have a width W2, which may be substantially similar to width W of optical element 102. In other examples, one or more of the widths W, W1, or W2 are different.

Each transmission assembly 104, 104A may include substantially all of the components illustrated in FIG. 1B. In other examples, one or more of the components illustrated in FIG. 1B are shared between transmission assemblies 104 and 104A. Moreover, each of the transmission assemblies 104 and 104A and/or the optical elements 102, 102A, and/or 102B can be used simultaneously or independently. In some examples, transmission assembly 104 can be removed, and transmission assembly 104A can remain, employing one or both of optical elements 102A and 102B.

Figures 3A, 3B:
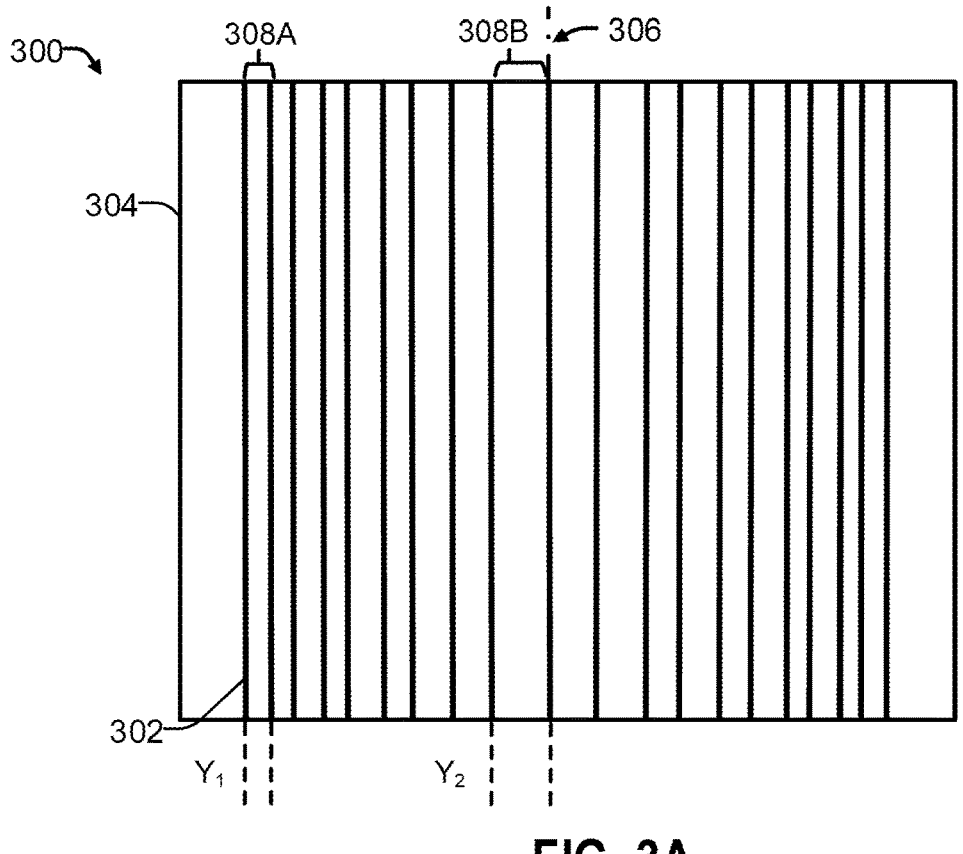
FIGS. 3A and 3B illustrate example laser arrays to generate lasers for the transmission assembly incorporating an ultra-wide field illumination diffuser.

FIGS. 3A and 3B illustrate example laser arrays 300 and 320 (for EEL 120) to generate lasers for the transmission assemblies of FIGS. 1A, 1B and 2. In some examples, the laser arrays 300 and 320 are arranged as edge emitting laser (EEL) arrays, employing multiple semiconductor lasers arranged in a randomly spaced, a non-uniform, or a uniform pattern.

The example EEL array 300 of FIG. 3A provides multiple non-uniformly spaced lasers 302 on a substrate 304. The EEL array is defined by laser-to-laser distances that are relatively sparse at a center of the array, and relatively more dense at edges of the array. In the disclosed example, the lasers 302 arranged in a middle section of the array (e.g., closer to centerline 206) have a greater space between them, in contrast to the lasers arranged in an edge section, where the lasers have a smaller space therebetween.

The change in distance $Y_1$ between lasers 302 of a first set 308A and the change in distance $Y_2$ between lasers 302 of a second set 308B can be designed to form a consistent difference across the array. For example, the distance between lasers within the array can vary based on a distance from a centerline 306 of the array. In the example of FIG. 3A, the lasers 302 arranged near the centerline 306 are separated by a greater distance than lasers 302 arranged at edges of the substrate 304. Although some examples show a predictable arrangement of the lasers 302 (e.g., an incremental spacing between lasers 302; a mirror image arrangement of laser 302 about the centerline 306), in some examples lasers can have different spacing. The spacing between adjacent lasers 302 may be randomly determined, and/or with varying spacing between lasers, which may or may not present a mirror image relative to a centerline.

As shown in FIG. 3B, the EEL array 330 is arranged with uniformly spaced lasers 322 on a substrate 324. In the example of FIG. 3B, a distance X between lasers 322 within the EEL array 100 can be fixed. In other words, the distance or spacing between each laser 102 and each adjacent laser 322 is uniform.

In some examples, the laser arrays 300 and/or 320 can include one or more of a ridge-type single quantum well (SQW) or multiple quantum well (MQW) semiconductor laser, a buried heterostructure (BH) SQW or MQW laser, a distributed-feedback (DFB) or Distributed Bragg reflector (DBR) laser, a Vertical-cavity surface-emitting laser (VCSEL), Photonic crystal surface-emitting lasers, InP based laser, GaAs based laser, GaSb based laser, GaN based laser, or other suitable laser.

Further, although one or more laser types and/or wavelengths are discussed in the several examples, application of the concepts disclosed herein are not limited to a particular laser or wavelength. In some examples, lasers are disclosed that operate over a range of wavelengths, including 940 nanometers, 980 nanometers, 1350 nanometers, 1380 nanometers, 1480 nanometers, and/or 1550 nanometers, as a list of non-limiting examples.

The disclosed monolithic laser array can provide benefits to a variety of applications, such as spot or flood illuminators using edge emitting laser (EEL) arrays, among other examples. For instance, non-uniform EEL arrays serve to reduce "speckle" by projecting laser light in an irregular arrangement to wash out speckle through interaction between lasers of the EEL array and the various optics (e.g., elements 102, 130, 134, etc.). Thus, the various interactions result in a flood projector with a desired uniform output, as disclosed herein.

In disclosed examples, a transmission assembly to project illumination from an edge of an electronic device includes an optical source to generate laser light; an optical focusing element to focus the laser light; and a transmitting optical element arranged at a bezel proximate an external edge of the electronic device, the transmitting optical element to receive the laser light from the optical source and projects the laser light through the bezel to illuminate an object of interest.

In some examples, the optical source comprises an edge emitting laser (EEL) array. In examples, the EEL array comprises multiple uniformly spaced lasers. In examples, the EEL array comprises multiple non-uniformly spaced lasers.

In some examples, the optical source is one or more of a ridge type single quantum well (SQW) or multiple quantum well (MQW) semiconductor laser, a buried heterostructure (BH) SQW or MQW laser, a distributed-feedback (DFB) or Distributed Bragg reflector (DBR) laser, a Vertical-cavity surface-emitting laser (VCSEL), photonic crystal surface-emitting lasers, InP based laser, GaAs based laser, GaSb based laser, or GaN based laser. In examples, the optical focusing element comprises one or more of a prism, a coated mirror, coated optical block, a lens, or a reflector.

In some examples, an optical projection element is to structure the illumination through the bezel in one or more patterns. In examples, the optical projection element is one or more of a micro-lens array or a diffractive optical element (DOE) to structure the illumination in one of a regular or a random pattern.

In some examples, the transmission assembly includes one or more of a substrate, an integrated circuit controller, or a photodiode.

In some examples, the optical focusing element reflects the laser light at an angle substantially orthogonal to a direction of the laser light being transmitted from the optical source.

In examples, the electronic device comprises a display screen arranged within a device case, wherein the device case defines the external edge of the electronic device. In examples, the transmission assembly is arranged at least in part between the display screen and the device case.

In some disclosed examples, an electronic device employing a transmitting optical element to illuminate an object of interest includes a device case defining an external edge of the electronic device; a display screen arranged within the device case; a transmission assembly arranged at least in part between the display screen and the device case; and a focusing optic to direct laser light to the transmitting optical element to project laser light from the transmission assembly to illuminate the object, wherein the projecting optic is arranged proximate the external edge of the electronic device.

In some examples, the electronic device includes a bezel arranged between an edge of the display screen and the external edge of the electronic device.

In examples, a length of the edge of the display screen substantially aligns with a length of the external edge of the electronic device.

In some examples, the electronic device includes a receiver sensor to capture illumination from the laser light reflecting from an object of interest.

In some examples, the electronic device includes a control circuit to control and synchronize activation of the trans- mission assembly and the receiver sensor to capture illumi- nation from the laser light. In examples, the electronic device includes another transmission assembly with another transmitting optical element.

In examples, the laser light has a wavelength of 940 nanometers or 1380 nanometers.

In some examples, the electronic device is one or more of a smartphone or tablet computer.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may com- prise a first "circuit" when executing a first one or more lines of code and may comprise a second "circuit" when execut- ing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, micro- processors, digital signal processors (DSPs), and/or other logic circuitry, and/or associated software, hardware, and/or firmware. Control circuits or control circuitry may be located on one or more circuit boards that form part or all of a controller.

In the drawings, similar features are denoted by the same reference signs throughout.

The foregoing description of preferred and other embodi- ments is not intended to limit or restrict the scope or applicability of the inventive concepts conceived of by the Applicants. It will be appreciated with the benefit of the present disclosure that features described above in accor- dance with any embodiment or aspect of the disclosed subject matter can be utilized, either alone or in combina- tion, with any other described feature, in any other embodi- ment or aspect of the disclosed subject matter.

The invention claimed is:

1. An electronic device, comprising:
a device case defining a back side and an external edge of the electronic device;
a display screen arranged within the device case with a notchless edge of the display screen facing the external edge of the electronic device and with a back side of the display screen facing the back side of the electronic device;
an optical element positioned between the notchless edge of the display screen and the external edge of the electronic device; and
a transmission assembly comprising a first portion between the back side of the display screen and the back side of the device case and a second portion that extends laterally beyond the notchless edge of the display screen, wherein the second portion of the transmission assembly directs laser light toward the optical element positioned between the notchless edge of the display screen and the external edge of the device case; and
wherein the optical element projects the laser light from the transmission assembly to illuminate an object of interest.

2. The electronic device of claim 1, comprising a bezel arranged between the notchless edge of the display screen and the external edge of the electronic device.

3. The electronic device of claim 2, wherein a length of the notchless edge of the display screen substantially aligns with a length of the external edge of the electronic device.

4. The electronic device of claim 1, comprising a receiver sensor to capture light reflected from the object of interest including a portion of the laser light projected by the optical element.

5. The electronic device of claim 4, comprising a control circuit to control and synchronize activation of the trans- mission assembly and the receiver sensor to capture a portion of the laser light projected by the optical element and reflected from the object of interest.

6. The electronic device of claim 1, comprising:
another optical element positioned between another notchless edge of the display screen; and
another transmission assembly that directs another laser light toward the another optical element.

7. The electronic device of claim 4, wherein the laser light has a wavelength of 940 nanometers or 1380 nanometers.

8. The electronic device of claim 7, wherein the electronic device is one or more of a smartphone or tablet computer.

9. The electronic device of claim 1, wherein an optical source of the first portion of the transmission assembly comprises an edge emitting laser (EEL) array that generates the laser light.

10. The electronic device of claim 9, wherein the EEL array comprises multiple uniformly spaced lasers.

11. The electronic device of claim 9, wherein the EEL array comprises multiple non-uniformly spaced lasers.

12. The electronic device of claim 1, wherein:
the first portion of the transmission assembly comprises an optical source that generates the laser light; and
the optical source is one or more of a ridge type single quantum well (SQW) or multiple quantum well (MQW) semiconductor laser, a buried heterostructure (BH) SQW or MQW laser, a distributed-feedback (DFB) or Distributed Bragg reflector (DBR) laser, a Vertical-cavity surface-emitting laser (VCSEL), pho- tonic crystal surface-emitting lasers, InP based laser, GaAs based laser, GaSb based laser, or GaN based laser.

13. The electronic device of claim 1, wherein:
the second portion of the transmission assembly com- prises an optical focusing element that directs the laser light toward the optical element; and
the optical focusing element comprises one or more of a prism, a coated mirror, coated optical block, a lens, or a reflector.

14. The electronic device of claim 13, wherein:
an optical projection element positioned to receive the laser light from the optical focusing element; and
the optical projection element structures an illumination of the object of interest based on the received laser light.

15. The electronic device of claim 14, wherein the optical projection element comprises one or more of a micro-lens array or a diffractive optical elements (DOE) that structure the illumination in one of a regular pattern or a random pattern.

16. The electronic device of claim 1, wherein the transmission assembly comprises one or more of an integrated circuit controller or a photodiode.

17. The transmission assembly of claim 13, wherein:

the first portion of the transmission assembly comprises an optical source that generates the laser light; and the optical focusing element reflects the laser light at an angle substantially orthogonal to a direction of the laser light being transmitted from the optical source.

\* \* \* \* \*